United States Patent [19]

Chestnutt

[11] Patent Number: 5,062,380
[45] Date of Patent: Nov. 5, 1991

[54] DISTRESS SIGNAL

[76] Inventor: Billy D. Chestnutt, Rte. 1, Box 299, Magnolia, N.C. 28453

[21] Appl. No.: 571,979

[22] Filed: Aug. 24, 1990

[51] Int. Cl.⁵ ............................ G09F 7/02; B60Q 7/00
[52] U.S. Cl. .................................. 116/28 R; 116/175; 40/591; 40/597; 40/602
[58] Field of Search ................. 40/586, 591, 594, 597, 40/602; 116/28 R, 30, 173, 175, 209

[56] References Cited

U.S. PATENT DOCUMENTS

| | | | |
|---|---|---|---|
| 884,950 | 4/1908 | Page | 116/175 |
| 1,531,694 | 3/1925 | Downing | 116/28 R |
| 2,933,841 | 4/1960 | Lawlor | 116/28 R |
| 3,024,552 | 3/1962 | MacLea | 116/28 R |
| 3,738,039 | 6/1973 | Defuria | 40/591 |
| 4,002,138 | 1/1977 | Dobala | 116/28 R |
| 4,884,524 | 12/1989 | Minotti | 116/28 R |

FOREIGN PATENT DOCUMENTS

| | | | |
|---|---|---|---|
| 1348435 | 12/1963 | France | 40/591 |
| 340146 | 9/1959 | Switzerland | 116/28 R |

Primary Examiner—William A. Cuchlinski, Jr.
Assistant Examiner—W. Morris Worth
Attorney, Agent, or Firm—John B. Dickman, III

[57] ABSTRACT

An automobile distress signal for attaching to the side window of an automobile where said distress signal is L-shaped with a short leg and a long leg, the shorter leg having a window mounting attachment. In the primary embodiment the mounting attachment is a pair of suction cups. In other embodiments hook and loop connectors are used, as well as a hook mounting attachment for hooking over the top edge of a window.

5 Claims, 1 Drawing Sheet

DISTRESS SIGNAL

BACKGROUND OF THE INVENTION

The present invention relates to an automobile distress signal, and, in particular, an automobile distress signal for mounting on the side window of an automobile.

In the past, people whose automobile had broken down or stopped running would use a makeshift flag to signal they were in distress. Pieces of clothing or cloth would be hung from the radio antenna or dropped out the window.

More recently, plastic distress flags have been hung from the antenna. However, these makeshift flags and plastic distress flags often drooped, or fell off without being seen.

There are several types of distress markers to warn of an automobile in distress. There is the commonly seen distress triangle placed behind the automobile. Usually these triangles have a reflective surface for seeing at night. Another similar distress signal has reflectors and is also placed behind the automobile. Both of these distress markers are collapsible for storage.

The problem with most distress signals is that they are hard to store, and when used they are not prominently displayed. Further, those signals that are placed on the ground are easily forgotten or knocked over.

SUMMARY OF THE INVENTION

The present invention overcomes the objections of the present available distress signals, by providing a distress signal which attaches to automobile side windows and when not in use is easily stored in a glove box.

It is a primary object of the invention to provide an automobile distress signal for mounting on a side window of an automobile where it can be seen by passing motorists, patrol cars and the like.

A further object is to provide an easy to attach mounting means for an automobile distress signal.

Another object is to provide an automobile distress signal of unitary construction.

The present invention relates to an automobile distress signal, and more particularly a distress signal for mounting on a side window.

The distress signal is of unitary construction having an L-shape. The long leg of the L-shape will protrude perpendicularly from the side window of an automobile. The short leg of the L-shape has an attaching means for holding the distress signal on the window.

In the preferred embodiment, suction cups attach the distress signal to a side window. A second embodiment uses a window hook which connects to the top edge of the window. A third embodiment uses a hook and loop connector for attaching the distress signal.

DESCRIPTION OF THE INVENTION

Figure 1:
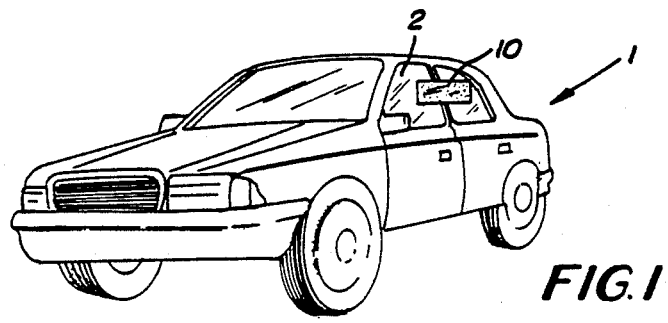
FIG. 1 is a perspective view of an automobile with a distress signal of the present invention.

Referring to the drawings, FIGS. 1-7, there is shown in FIG. 1 an automobile 1 which has had some kind of problem such as mechanical, fuel, and the like. Attached to the driver's side window 2 is a distress signal 10. The distress signal 10 is a molded plastic having an L-shape, as shown in FIGS. 2-4, 6 and 7. The distress signal 10 projects at least seven inches from the window and is at least three inches wide to make it clearly visible to passing motorists.

Figure 2:
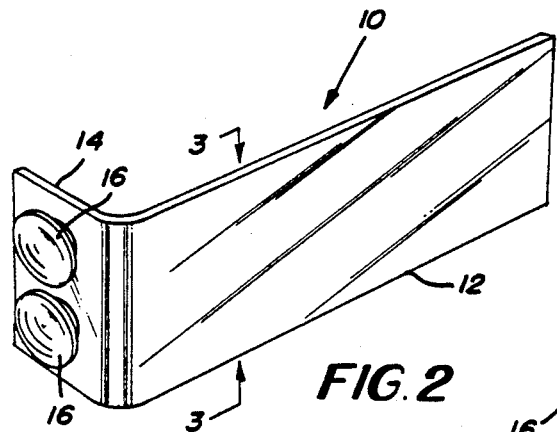
FIG. 2 is a perspective view of a distress signal of the invention.
Figure 3:
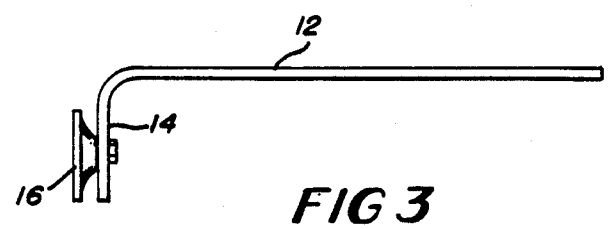
FIG. 3 is a side plan view taken along the line 3-3 of FIG. 2.

The primary embodiment of the distress signal 10 is shown in FIGS. 2 and 3. The signal 10 is L-shaped having a long leg 12 and a short right angled leg 14. The short leg 14 has suction cups 16 affixed to it. The suction cups 16 are wetted and stuck to the window glass 2 of the automobile 1. The distress signal has a fluorescence pigment in the plastic or a coating covering the plastic. Colors such as distress orange, yellow and pink are best suited for distress signals. It is possible to include reflective material in the pigment or coating, to reflect the light from an automobile's headlights.

Figure 4:
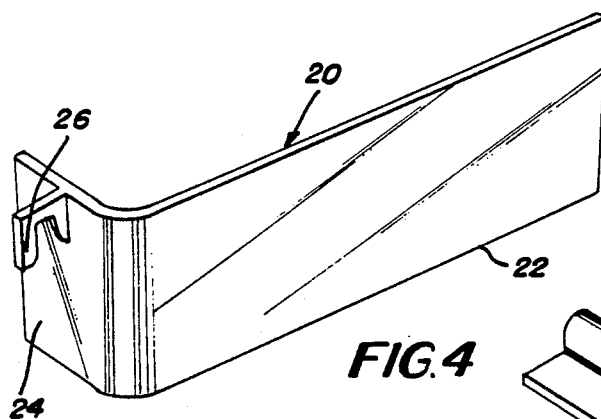
FIG. 4 is another embodiment of the invention.

FIG. 4 shows another embodiment of the invention where the distress signal 20 has an L-shape with a long leg 22 and short leg 24. Molded into the unitary construction is a hanging hook 26. The hanging hook 26 fits over the top edge of a side window. The window can be rolled up to pinch the hanging hook 26 between the window and window frame (not shown).

Figure 5:
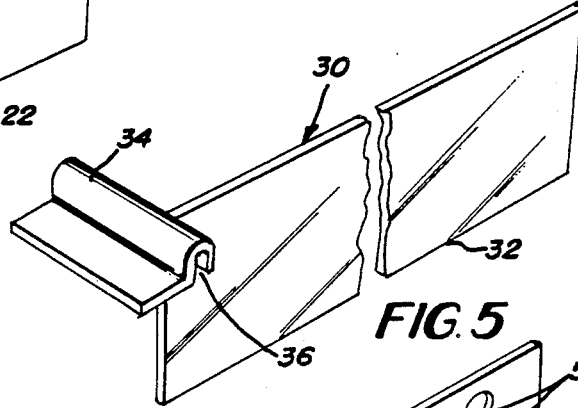
FIG. 5 is still another embodiment of the invention.

FIG. 5 shows an embodiment of the invention where a distress signal 30 has a T-shape with the longer leg 32 projecting from the automobile. The cross leg 34 is perpendicular in both horizontal and vertical directions to longer leg 32. There is an elongated hanging hook portion 36 which extends the length of cross leg 32 to hang the distress signal 30 on the side window 2 of an automobile 1. Because of the length of the cross leg 32 the distress signal 30 is more stable than the distress signal 20 of FIG. 4. Both distress signals 20 and 30 hang from a window edge with their lower ends functioning as a stabilizing point and the hooks 26 and 36, respectively, the other stabilizing point. Since the distress signal 30 has a broader stabilizing hook 36, the signal will withstand shock from air and wind forces much better.

Figure 6:
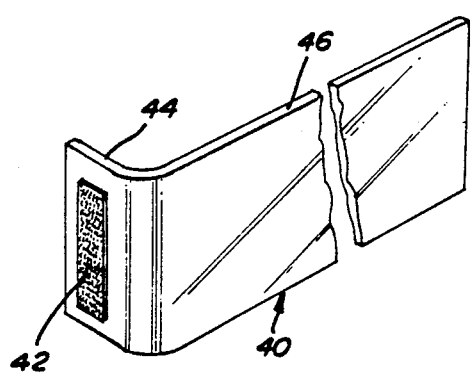
FIG. 6 is still another embodiment of the invention.

In FIG. 6, the distress signal 40 has a hook and loop connector 42 for supporting the signal 40. One half of the hook and loop connector 42 is permanently affixed to a side window, preferably a rear side window which either is fixed or only rolls down part way. The other half of the hook and loop connector 42 is affixed to the shorter leg 44 that is at right angle to longer leg 46, so that connecting the two halves of connector 42 together secures the distress signal to the window.

Figure 7:
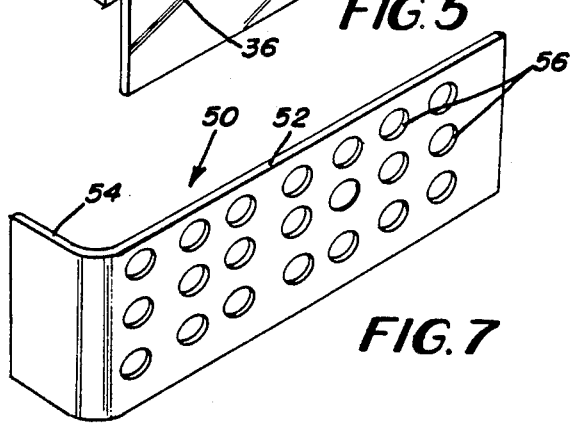
FIG. 7 is an embodiment of the invention with air holes.

There are occasions when any of the distress signals 10, 20, 30 or 40 may be reacted upon by air or wind forces. In order to minimize the effects of air or wind on one of the distress signals, FIG. 7 shows an embodiment of the invention which shows a distress signal 50 with longer leg 52 and shorter leg 54. Longer leg 52 has a plurality of air holes 56 to reduce the effects of air or wind. Leg 52 may replace longer legs 12, 22, 32 or 46 of distress signals 10, 20, 30 or 40, respectively.

While various embodiments of the invention have been shown, it is understood that one skilled in the art may realize other embodiments. Therefore one should consider the drawings, description and claims for a complete understanding of the invention.

What is claimed:

1. A safety device for attaching to a vertically movable side window of a vehicle to indicate that a motorist is in need of aid, comprising:
    (a) a first member and a second member integral with and at a right angle to each other;
    (b) said second member extending perpendicular from said window and having a width and length visible to passing motorists;
    (c) said first member having a width about the same as said second member, and where said first member is parallel to said window to support said second member; and
    (d) a mounting means on said first member for attaching and holding said safety device to said window.

2. A safety device as in claim 1 wherein said mounting means is at least one suction cup that adheres to said window.

3. A safety device as in claim 1 wherein said mounting means is a hook for resting on the top edge of said window, where said hook extends perpendicularly from the back of said first member, wherein said first member has a bottom edge which rests against said window to stabilize said safety device.

4. A safety device as in claim 1 wherein said mounting means is a hook and loop fastener means, where one half or the other is adhered to said first member and the other half is adhered to said window surface to receive said safety device.

5. A safety device for attaching to a vertically movable window of a vehicle to indicate that a motorist is in need of aid, consisting of,
    (a) a unitary body having a T-shape including a first leg and a second leg at right angles to one another; said second leg being the longer of the legs, intersecting at right angle with and mid way of said first member;
    (b) said second member extending perpendicularly from said window with a width and length visible to passing motorists, where said width hangs vertically from said window;
    (c) said first member having an integral hook, of a width equal to the width of said first member and parallel to said window to hook over the top edge of said window, where said window is closed on said first member to secure said safety device to the vehicle.

* * * * *